United States Patent
Williams et al.

(10) Patent No.: US 10,053,891 B1
(45) Date of Patent: Aug. 21, 2018

(54) VEHICLE ACCESSORY LOCK

(71) Applicant: Toyota Motor Engineering & Manufacturing North America, Inc., Erlanger, KY (US)

(72) Inventors: Paxton S. Williams, Milan, MI (US); Matthew C. Tier, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/611,949

(22) Filed: Jun. 2, 2017

(51) Int. Cl.
  *B62D 33/027* (2006.01)
  *E05B 73/00* (2006.01)
(52) U.S. Cl.
  CPC ............ *E05B 73/00* (2013.01); *B62D 33/027* (2013.01); *B62D 33/0273* (2013.01)
(58) Field of Classification Search
  CPC ...... E05B 73/00; B62D 33/03; B62D 33/0273
  USPC ............. 296/57.1, 56, 1.07, 1.05; 70/58, 61, 70/DIG. 34, DIG. 33; 292/162, 164, 292/DIG. 4, DIG. 72
  See application file for complete search history.

(56) References Cited

U.S. PATENT DOCUMENTS

| 2,242,201 | A | * | 5/1941 | Woods | B64D 47/08 244/118.1 |
| 5,588,631 | A | * | 12/1996 | Yee | B60R 11/06 211/4 |
| 6,030,018 | A | | 2/2000 | Clare et al. | |
| 2008/0231067 | A1 | | 9/2008 | Nagle | |
| 2014/0150215 | A1 | | 6/2014 | LaPray | |

* cited by examiner

*Primary Examiner* — Dennis H Pedder
(74) *Attorney, Agent, or Firm* — Christopher G. Darrow; Darrow Mustafa PC

(57) ABSTRACT

A device and process for a vehicle accessory lock are disclosed. The vehicle accessory lock includes a plunger housing defining a plunger bore and mountable through a door jamb. A security plunger, being spring-loaded, is received by the plunger housing. The security plunger, responsive to a closing force imparted by a hinged door surface against the security plunger, being operable to extend and engage a plunger receiver defined by a vehicle accessory to produce a locked vehicle accessory state.

20 Claims, 4 Drawing Sheets vehicle accessory lock 200
(LOCKED STATE)

VEHICLE ACCESSORY LOCK

FIELD

The subject matter described herein relates in general to vehicle accessory security devices and, more particularly, to the selective locking of a vehicle accessory to deter unauthorized removal.

BACKGROUND

Vehicles with lighting accessories or other forms of vehicle accessories are known, and may be available from original equipment manufacturers and/or after-market manufacturers. Generally, lighting accessories for pickup trucks have generally related to the style or look of the vehicle, such as chromed accessories, as well as functional, such as winches, and additional vehicle lighting, such as the vehicle cargo bed. Vehicle owners have experienced unauthorized removal of accessories mounted and/or installed in the open areas of a vehicle, and techniques have been sought with respect to securing these accessories, while maintaining the vehicle aesthetics. Such techniques have used conventional lock-and-key devices, prioritized fastener head configurations requiring specialized tools to remove and/or service such devices, as various complex techniques. Though effective, the overt use of such techniques further convey the perceived values of such accessories, and may have the inadvertent effect of making them more of a sought-after challenge for unauthorized removal. Also, as time passes, a vehicle owner may lose track of the keys or specialized tools need to remove the accessories for maintenance, repair, and/or replacement. A need exists for securing accessories in non-secured areas of a vehicle, such as a pickup truck bed, without overt and unsightly security measures, that may operate to lock and/or secure the accessory from unauthorized removal.

SUMMARY

A device and process for a vehicle accessory lock are disclosed.

In one implementation, a vehicle accessory lock is disclosed. The vehicle accessory lock includes a plunger housing defining a plunger bore and mountable through a door jamb. A security plunger, being spring-loaded, is received by the plunger housing. The security plunger, responsive to a closing force imparted by a hinged door surface against the security plunger, being operable to extend and engage a plunger receiver defined by a vehicle accessory to produce a locked vehicle accessory state.

In another implementation, a method for placing a vehicle accessory in a locked state is disclosed. The method includes biasing a security plunger of a vehicle accessory lock in a biased unlocked state. A closing force may be imparted by a hinged door surface to the security plunger of a vehicle accessory lock, the closing force being sufficient to overcome the biased unlocked state, and to extend the security plunger inside a panel space defined by a vehicle panel. The security plunger engages a plunger receiver co-located inside the panel space to produce a locked state while the hinged door surface remains at a closed position.

BRIEF DESCRIPTION OF THE DRAWINGS

The description makes reference to the accompanying drawings wherein like reference numerals refer to like parts throughout the several views, and wherein.

DETAILED DESCRIPTION

A vehicle accessory lock for limiting removal of a vehicle accessory mounted in an open area of a cargo area is described herein. One example vehicle accessory lock includes a plunger housing mountable through a door jamb, and a security plunger being spring-loaded and received by the plunger housing. In response to a closing force imparted by a hinged door surface of a hinged door, such as a tailgate, the security plunger can be operable to extend and engage a plunger receiver of a vehicle accessory to produce a locked vehicle accessory state. In this manner, when the hinged door is closed, the vehicle accessory lock operates to limit removal of the vehicle accessory (such as a deck light assembly). Further, when a hinged door lock is itself locked, the vehicle accessory can be removed by those with the key and/or key fob operable to unlock the hinged door lock.

Figure 1:
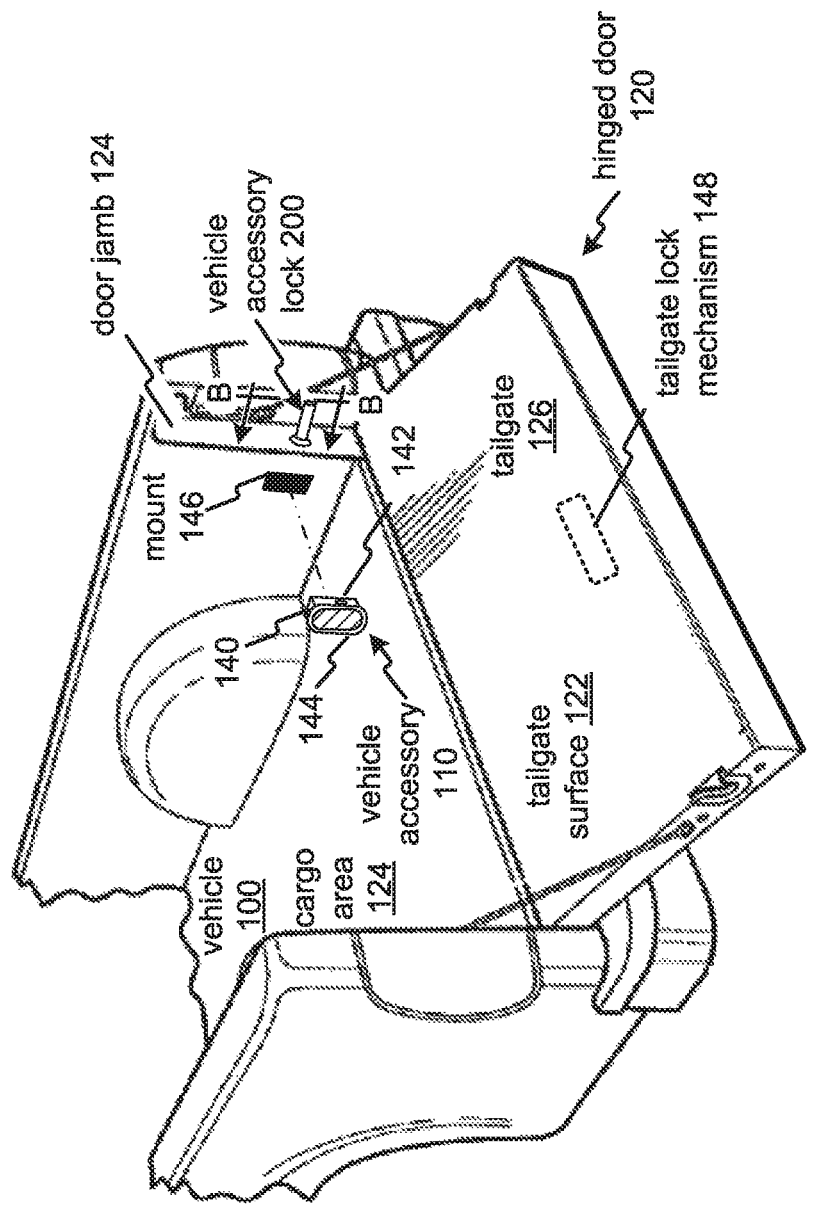
FIG. 1 illustrates a vehicle that includes a vehicle accessory lock.

FIG. 1 illustrates a vehicle 100 that includes a vehicle accessory lock shown generally at reference numeral 200. The vehicle 100 shows a vehicle with an open cargo area 124, such as a pickup truck model vehicle, which may also include a hinged door 120, such as a tailgate 126 with a tailgate surface 122 and tailgate lock mechanism 148.

The vehicle accessory lock 200 may interact with a vehicle accessory, shown generally at reference numeral 110. The vehicle accessory 110 of the example of FIG. 1 may include a deck light assembly, which may include a deck light housing 140 containing a light source (such as a filament light bulb, a solid-state light bulb (that is, an LED), etc.). A light cover 144 may operate to contain the light source within the deck light housing 140, as well as a light diffraction screen to adjust the ambient light energy displayed by the vehicle accessory 110 when activated to illuminate the cargo area 124. The vehicle accessory lock 200, when the accessory includes a deck light assembly, may also be referred to as a vehicle deck light lock.

As may be appreciated, the vehicle accessory 110 may simply be received by mount 146 defined in a sidewall of the cargo area 124, and removably secured by retainer clips, or other such mechanisms to hold the accessory 110 in position with the vehicle 100. The vehicle accessory 110 may be installed during vehicle assembly, and/or may be provided as an aftermarket original equipment manufacturer (OEM) vehicle accessory. A vehicle owner may remove the vehicle accessory 110 for repair, such as to replace the light source or a damaged light cover 144, replace the vehicle accessory with a "like" accessory (such as another deck light assembly), or for replacement with other various vehicle accessories (such as, e.g., an external speaker for music playback and/or audio playback from a near-field communication device (such as a handheld mobile device including a smartphone, tablet, phablet, etc.)). Without more, the vehicle accessory 110 may be subject to unauthorized removal unless removal may be restricted by the vehicle accessory lock 200.

In operation, the vehicle accessory lock 200 may operate to engage the vehicle accessory 110 upon closing of the hinged door 120. In the example of FIG. 1, the vehicle accessory lock 200 may be mounted with the door jamb 124. The door jamb 124 operates to define a stoppage point for the hinged door 120.

Generally, the physical action that may operate to engage the vehicle accessory lock 200 may be accomplished by closing the hinged door 120. In this respect, the tailgate is pivoted upward to close against the door jamb 124, as well as pivoted downward (once closed) to place in an open position such as that shown in FIG. 1. With respect to the force exerted to place the tailgate 126 in a closed position, the tailgate 126 may impart a closing force via the tailgate surface 122 to engage the vehicle accessory lock 200.

For example, the vehicle accessory lock 200 can be responsive to the closing force imparted by the tailgate surface 122 of the tailgate 126 (that is, the hinged door 120) against the security plunger of the vehicle accessory lock 200. When the closing force is imparted to the security plunger, the security plunger can be operable to extend and engage a plunger receiver 142 defined by the accessory housing 140.

Because the physical engagement of the vehicle accessory lock 200 with the vehicle accessory may occur within a vehicle panel void (such as the pickup truck side panel), the vehicle accessory 100 may be placed in a locked vehicle accessory state when the hinged door 120 is in a closed position, which is discussed in detail with reference to FIGS. 2 and 3.

As may be appreciated, a hinged door 120 may itself further include a locking mechanism such as the tailgate lock mechanism 148 being operable to secure the vehicle tailgate. The tailgate lock mechanism may require a key to lock the device, that is, the tailgate, to prevent the hinged door 120 from being opened, unless a person has the appropriate key, or key fob, to release the tailgate lock mechanism 148. Other forms of locking mechanisms may be applied, such those based on biometric input (e.g., finger print, hand print, eye scan, etc.) or combination-type locking mechanisms. Accordingly, when the tailgate lock mechanism 148 is locked, by transference, the vehicle accessory lock 200 also may remain locked until the tailgate lock mechanism can be released.

Figure 2:
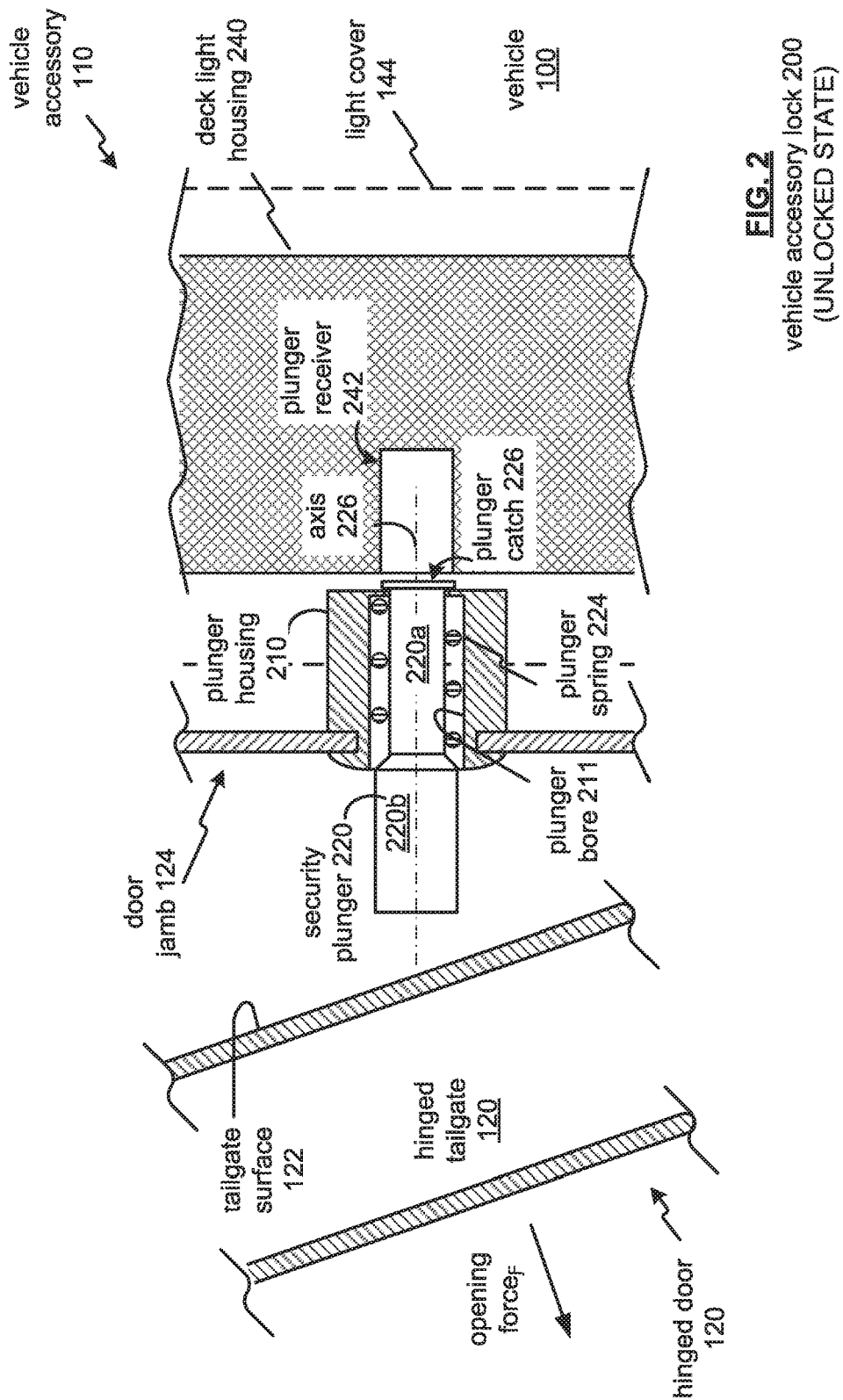
FIG. 2 illustrates a cross-sectional view taken along the line B-B of FIG. 1 of the vehicle accessory lock mounted with a vehicle jamb in an unlocked state.

FIG. 2 illustrates a cross-sectional view of the vehicle accessory lock 200 mounted with the vehicle jamb 124, taken along the line B-B of FIG. 1, in an unlocked state. The vehicle accessory lock 200 may include a plunger housing 210 that defines a plunger bore 211. The plunger bore 211 may receive a security plunger 220, which may be biased by a plunger spring 224 in an unlocked state.

A plunger catch 226 may operate to engage the plunger housing 210 to maintain the security plunger 220 with the plunger bore 211 of the plunger housing 210.

The security plunger 220 may include a first portion 220a and second portion 220b. The first portion 220a may receive the plunger spring 224 operable to impart a longitudinal force along an axis 226 of the security plunger 220 to bias the security plunger 220 in an unlocked vehicle accessory state. The second portion 220b may be received by the plunger bore 211 defined by the plunger housing 210. As shown, the first portion 220a and the second portion 220b have different dimensions to effect the bias that may be imparted by the plunger spring 224 via a dimensional transition region between the first portion 220a and the second portion 220b. A sloped transition may allow realignment of the security plunger 220 within the plunger bore 211. On the other hand, a stepped (or abrupt) transition may catch when the security plunger 220 extends beyond an outer region of the plunger housing 210 mounted through the door jamb 124. The plunger catch 226 coupled with the first portion 220a limits the longitudinal travel of the security plunger 220 in the unlocked state.

The vehicle accessory 110 may include a plunger receiver 242 defined by a housing component, such as deck light housing 240. The vehicle accessory 110 may include a flange for mounting the vehicle accessory 110 in a substantially fixed relation to the vehicle 100, such as via light cover 144. Also, the vehicle accessory 110 may be placed adjacent the vehicle accessory lock 200 for engagement in a locked state. As may be appreciated, the locking components may be contained within the vehicle body panel.

The hinged door 120 may be a hinged tailgate 120 defining a tailgate surface 122. As may be appreciated, hinged door 120 may pivot with a relation to a door hinge assembly in relation to an opening force $F$ or a closing force $F$. An opening force $F$ operates to release a force imparted by the tailgate surface 122 to the security plunger 220. A bias exerted by the plunger spring 224 relative to the plunger housing 210 extends the security plunger 220 away from the plunger receiver 242 of the vehicle accessory 110, placing the vehicle accessory 110 in an unlocked vehicle accessory state.

In contrast to an opening force $F$, the security plunger 220, responsive to a closing force $F$ imparted by a hinged door surface, such as tailgate surface 122, can extend and engage the plunger receiver defined by the vehicle accessory 110 to produce a locked vehicle accessory state, as is discussed in detail with reference to FIG. 3.

Figure 3:
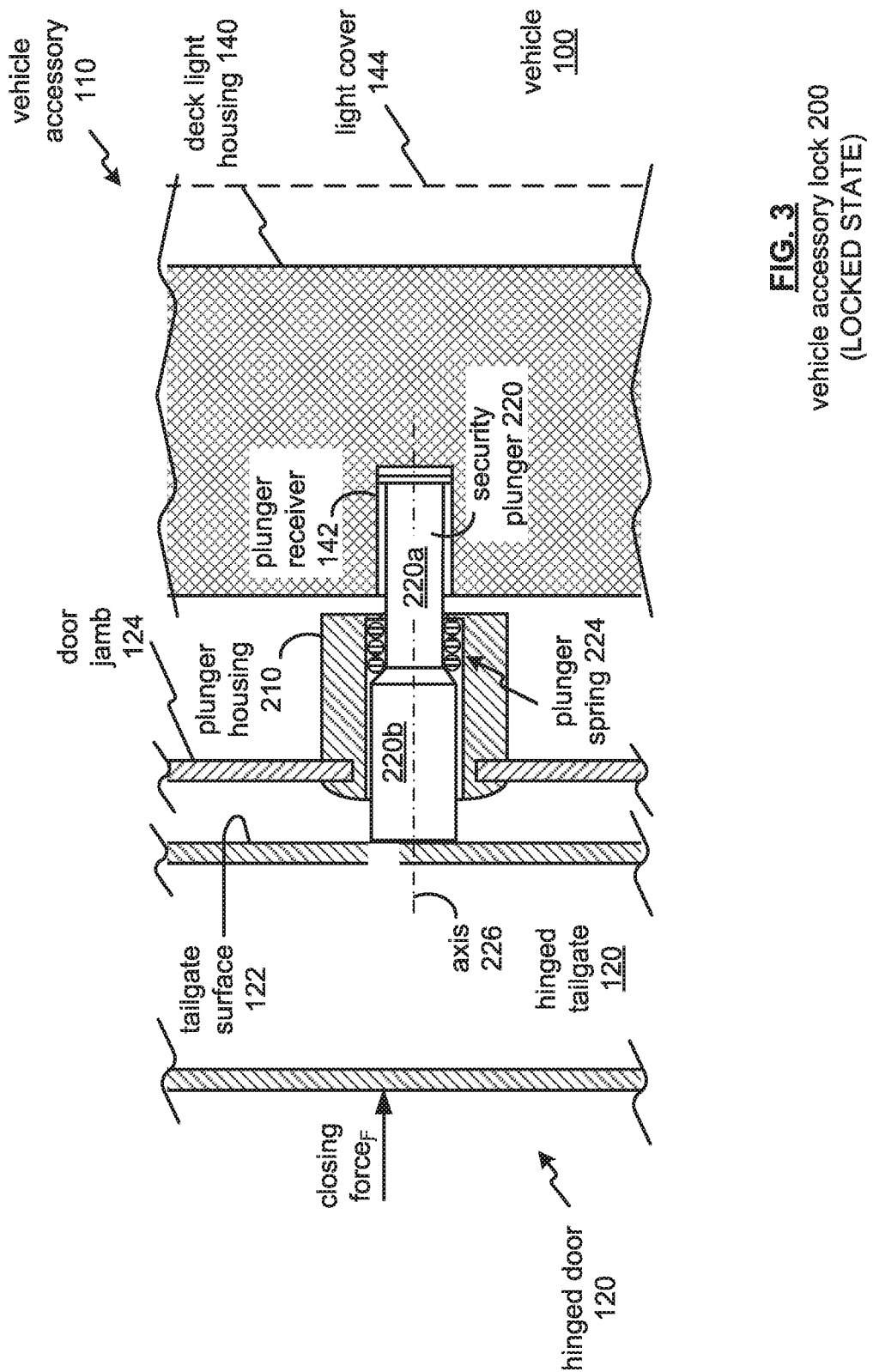
FIG. 3 illustrates a cross-sectional view taken along the line B-B of FIG. 1 of the vehicle accessory lock mounted with a vehicle jamb in a locked state.

FIG. 3 illustrates a cross-sectional view of the vehicle accessory lock 200 taken along the line B-B of FIG. 1, in a locked vehicle accessory state.

As noted, the hinged door 120 may be a hinged tailgate 120 defining a tailgate surface 122. As may be appreciated, hinged door 120 may pivot with a relation to a door hinge assembly in relation to an opening force $F$ or a closing force $F$. An closing force $F$ operates to impart a force by the tailgate surface 122 to the security plunger 220. The closing force $F$ may be generally sufficient to overcome the opposing bias exerted by the plunger spring 224 relative to the plunger housing 210. In other words, the bias parameter of the plunger spring 224 may be selected to bias the security plunger 220, while the also be insufficient to counter the closing force $F$.

In contrast to an opening force j, the security plunger 220, responsive to a closing force $F$ imparted by a hinged door surface, such as tailgate surface 122, can extend and engage the plunger receiver 142 defined by the vehicle accessory 110 to produce a locked vehicle accessory state.

To further secure the vehicle accessory 110, the plunger housing 210 may be concealed from an external view by the tailgated surface 122 while in the locked vehicle accessory state when the security plunger 220 operates to extend and engage the plunger receiver 142 defined by the vehicle accessory 110.

The vehicle accessory 110 may be further secured by a supplemental locking mechanism of the hinged door 120. Generally, vehicle doors may include door locks to prevent inadvertent door opening, as well as to secure vehicle contents. Pickup truck tailgates are regularly being fitted with a door lock to frustrate unauthorized removal of the hinged tailgate 120.

Accordingly, a tailgate lock mechanism 148 (FIG. 1) may operate to selectively secure the hinged tailgate 120 in a closed state subsequent to the closing force F being applied. Accordingly, the vehicle accessory 110 may not be removable until the tailgate lock mechanism 148 is unlocked (either by a key, a key fob, a smart phone application, etc.), and further not until an opening force F is applied to the hinged tailgate 120 for placing the vehicle accessory lock 200 in an unlocked state (FIG. 2).

Figure 4:
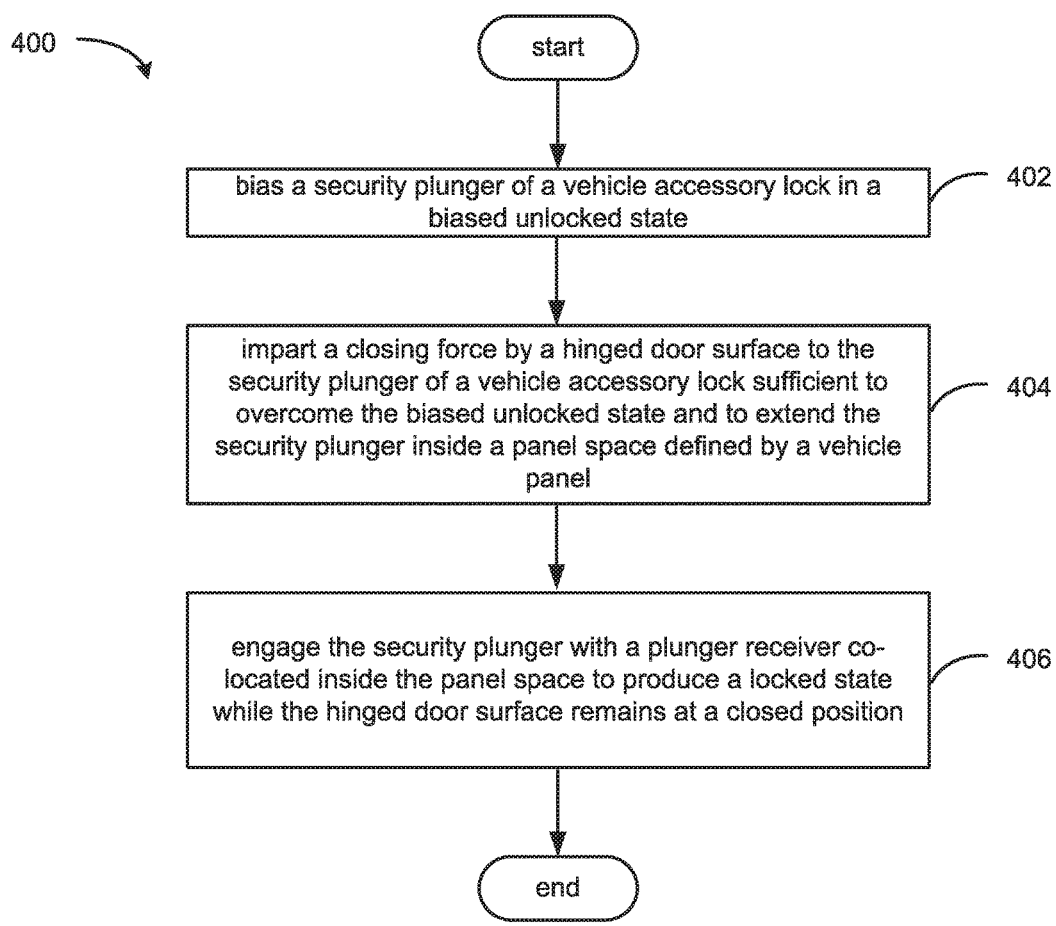
FIG. 4 shows an example process for placing a vehicle accessory lock in a locked state to secure a vehicle accessory.

FIG. 4 shows an example process 400 for placing a vehicle accessory in a locked state to secure a vehicle accessory.

At operation 402, a security plunger of a vehicle accessory lock is biased in a biased unlocked state. To produce a vehicle accessory lock state, a closing force may be imparted, via a hinged door surface, to the security plunger of a vehicle accessory lock sufficient to overcome the biased unlocked state, and to extend the security plunger inside a panel space defined by a vehicle panel. The vehicle accessory lock may be biased via a plunger spring about the security plunger. The bias level provided by the plunger spring can be sufficient to place the vehicle accessory lock in an unlocked state, while being insufficient to overcome a closing force imparted by a hinged door, via a hinged door surface, to the security plunger.

As may be appreciated, a vehicle panel space is generally inaccessible, as well as concealed, to deter unauthorized access to the vehicle accessory lock mechanisms.

At process 406, security plunger operates to engage a plunger receiver co-located inside the panel space to produce a locked state while the hinged door surface remains at a closed position. Further, the closing force imparted to the security plunger of the vehicle accessory lock may be sustained by latching a hinged door of the hinged door surface in a fixed and/or locked state via a door lock mechanism.

In addition, while in operation 406, the vehicle accessory lock, when mounted with a door jamb, may be further concealed by the hinged door surface.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

The flowcharts and block diagrams in the figures illustrate the architecture, functionality, and operation of possible implementations of devices, methods and processes according to various embodiments.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle accessory lock comprises:
 a plunger housing defining a plunger bore and mountable through a door jamb; and
 a security plunger being spring-loaded and received by the plunger housing,
 wherein the security plunger, responsive to a closing force imparted by a hinged door surface against the security plunger, being operable to extend and engage a plunger receiver defined by a vehicle accessory to produce a locked vehicle accessory state.

2. The vehicle accessory lock of claim 1, wherein the vehicle accessory comprises a deck light assembly.

3. The vehicle accessory lock of claim 2, wherein the security plunger further comprises:
 a first portion to receive a plunger spring operable to impart a longitudinal force along an axis of the security plunger to bias the security plunger in an unlocked vehicle accessory state; and
 a second portion operable to be received by the plunger bore.

4. The vehicle accessory lock of claim 2, wherein the deck light assembly further comprises:
 a light source;
 a light cover; and
 a deck light housing coupled with the light cover, the deck light housing including the light source, and defining the plunger receiver to receive the security plunger, wherein the deck light housing being cooperatively-mountable relative to the security plunger.

5. The vehicle accessory lock of claim 1, wherein the plunger housing is concealed from an external view while in the locked vehicle accessory state when the security plunger operates to extend and engage the plunger receiver defined by the vehicle accessory.

6. The vehicle accessory lock of claim 1, wherein the hinged door surface comprises a hinged tailgate.

7. The vehicle accessory lock of claim 6, wherein the hinged tailgate further comprises:
a tailgate lock mechanism operable to selectively secure the vehicle tailgate in a closed state subsequent to the closing force.

8. A vehicle deck light lock comprises:
a plunger housing defining a plunger bore and mountable through a door jamb; and
a security plunger being biased in an unlocked state and received by the plunger housing,
wherein the security plunger, responsive to a closing force imparted by a hinged tailgate surface against the security plunger, being operable to extend and engage a plunger receiver defined by a deck light housing to produce a locked state.

9. The vehicle deck light lock of claim 8, wherein the deck light housing further comprises:
a light source oriented to illuminate a cargo area; and
a light cover mounted with the deck light housing to protect the light source and including a surface to diffuse light energy produced by the light source,
wherein the deck light housing the deck light housing being cooperatively-mountable relative to the security plunger.

10. The vehicle deck light lock of claim 8, wherein the plunger housing is concealed from an external view while in the locked state when the security plunger operates to extend and engage the plunger receiver defined by the deck light housing.

11. The vehicle deck light lock of claim 8, wherein the security plunger further comprises:
a first portion to receive a plunger spring operable to impart a longitudinal force along an axis of the security plunger to bias the security in the unlocked state; and
a second portion operable to be received by the plunger bore.

12. The vehicle deck light lock of claim 8, wherein a hinged tailgate of the hinged tailgate surface further comprises:
a tailgate lock mechanism operable to selectively secure the hinged tailgate in a closed state subsequent to the closing force.

13. A method comprising:
biasing a security plunger of a vehicle accessory lock in a biased unlocked state;
imparting a closing force by a hinged door surface to the security plunger of a vehicle accessory lock sufficient to overcome the biased unlocked state and to extend the security plunger inside a panel space defined by a vehicle panel; and
engaging the security plunger with a plunger receiver co-located inside the panel space to produce a locked state while the hinged door surface remains at a closed position, wherein the plunger receiver being defined by a vehicle accessory.

14. The method of claim 13, further comprising:
sustaining the closing force imparted to the security plunger of the vehicle accessory lock by latching a hinged door of the hinged door surface.

15. The method of claim 14, wherein the sustaining the closing force further comprising:
selectively securing the hinged door in a closed state subsequent to the closing force via a door lock mechanism.

16. The method of claim 14, further comprising:
concealing the vehicle accessory lock by the hinged door surface.

17. The method of claim 13, wherein the vehicle accessory comprises a deck light assembly.

18. The method of claim 17, wherein the deck light assembly further comprises:
a light source;
a light cover; and
a deck light housing coupled with the light cover, the deck light housing including a light source, and defining the plunger receiver to receive the security plunger, wherein the deck light housing being cooperatively-mountable to the panel space relative to the security plunger.

19. The method of claim 15, wherein the security plunger further comprises:
a first portion to receive a plunger spring operable to impart a longitudinal force along an axis of the security plunger for biasing the security plunger in the biased unlocked state; and
a second portion operable to be received by a plunger bore defined by the vehicle accessory lock and engageable with the hinged door surface.

20. The method of claim 15, wherein a hinged tailgate provides the hinged door surface.

* * * * *

UNITED STATES PATENT AND TRADEMARK OFFICE
CERTIFICATE OF CORRECTION

PATENT NO. : 10,053,891 B1
APPLICATION NO. : 15/611949
DATED : August 21, 2018
INVENTOR(S) : Paxton S. Williams and Matthew C. Tier Page 1 of 1

It is certified that error appears in the above-identified patent and that said Letters Patent is hereby corrected as shown below:

In the Specification

Column 4, Line 44: Delete "An closing force," and insert --A closing force--

In the Claims

Column 7, Line 6 Claim 7: Delete "the vehicle tailgate" and insert --the hinged tailgate--

Column 7, Lines 24-25 Claim 9: Delete "wherein the deck light housing the deck light housing being," and insert --wherein the deck light housing being--

Column 7, Line 36 Claim 11: Delete "the security in," and insert --the security plunger in--

Signed and Sealed this
Eleventh Day of December, 2018

Andrei Iancu
*Director of the United States Patent and Trademark Office*